May 21, 1957 W. D. GAIMAN 2,792,970
DISTRIBUTOR FOR SOIL CONDITIONING COMPOUNDS
Filed Jan. 4, 1954 2 Sheets-Sheet 1

INVENTOR.
WALTER D. GAIMAN
BY
ATTORNEY

May 21, 1957 W. D. GAIMAN 2,792,970
DISTRIBUTOR FOR SOIL CONDITIONING COMPOUNDS
Filed Jan. 4, 1954 2 Sheets-Sheet 2
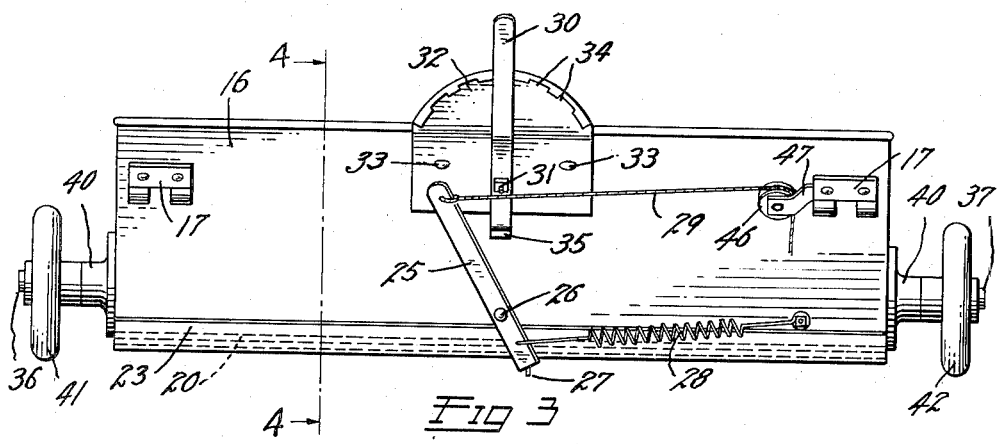
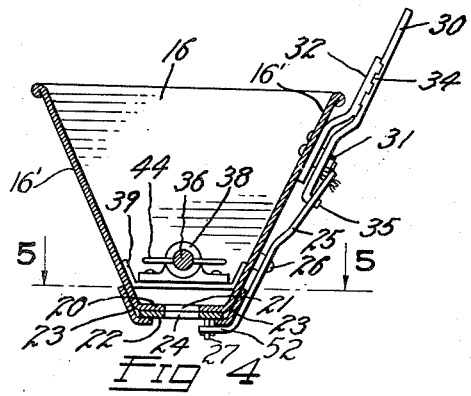
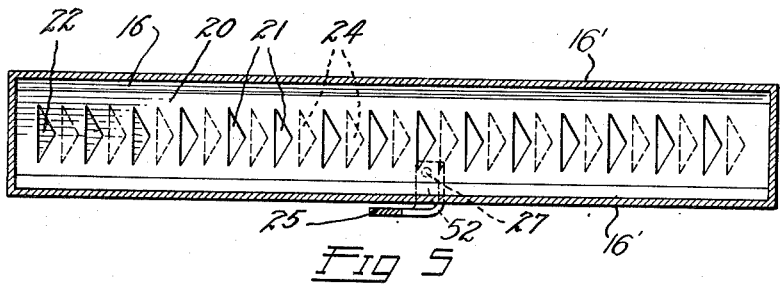
INVENTOR.
WALTER D. GAIMAN
BY
ATTORNEY United States Patent Office 2,792,970
Patented May 21, 1957

2,792,970
DISTRIBUTOR FOR SOIL CONDITIONING COMPOUNDS

Walter D. Gaiman, Lakewood, Colo.

Application January 4, 1954, Serial No. 401,893

1 Claim. (Cl. 222—164)

This invention relates to a device for scattering or distributing soil conditioning compounds upon lawns and has for its principal object the provision of a device of this character which can be applied to and driven by a conventional lawn mower (more particularly a power mower) so that the application of the compounds can be accomplished simultaneously with the cutting of the lawn.

By applying the compound simultaneously with the lawn cutting operation, both time and labor are conserved and it is possible to obtain a much more complete and uniform application of the compounds since the cut portions of the lawn definitely indicate the areas to which the compounds have been applied.

Another object of the invention is to provide a device of this character which can be quickly and easily applied to, and removed from, any conventional lawn mower and which can be stopped or started by the lawn mower operator without leaving his mowing position.

A further object is to provide means in a scattering or distributing device for minutely presetting the maximum rate of discharge of the compounds so as to insure a uniform application over the entire lawn.

A still further object is to provide an agitating mechanism for the compounds in the device which will be driven directly from the two wheels of a lawn mower and which will accommodate the differential in speeds between the two wheels as the mower is directed in curved paths.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 3 is a rear view of the device;

Fig. 4 is a cross-section therethrough, taken on the line 4—4, Fig. 3; and

Fig. 5 is a longitudinal, horizontal section looking downward on the line 5—5, Fig. 4.

While the invention is more particularly designed for use on, and will be herein described as mounted on, a power-driven lawn mower, it is, of course, applicable to any type of mower.

Figure 1:
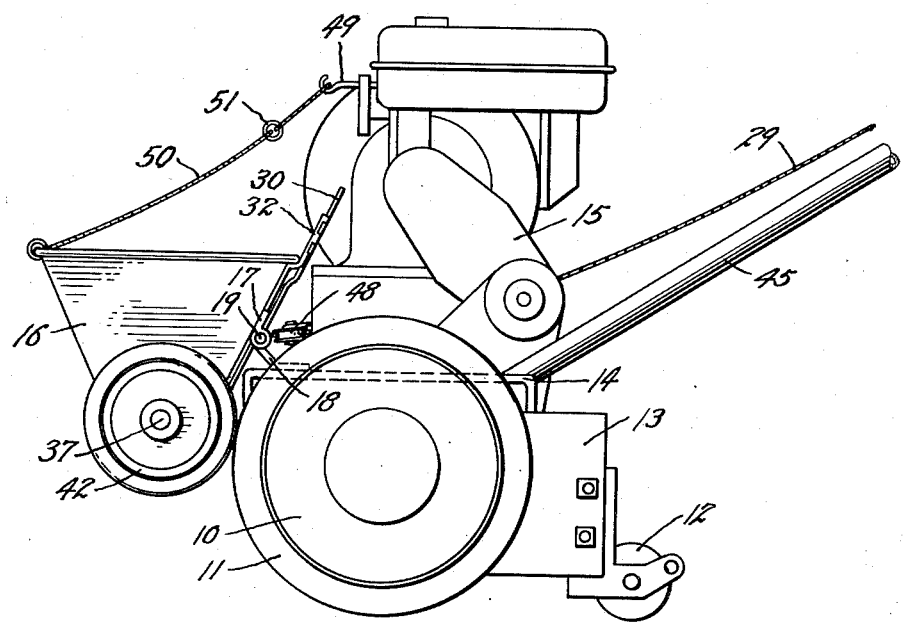
Fig. 1 is a side view of a conventional power-driven lawn mower illustrating the invention in place thereon.
Figure 2:
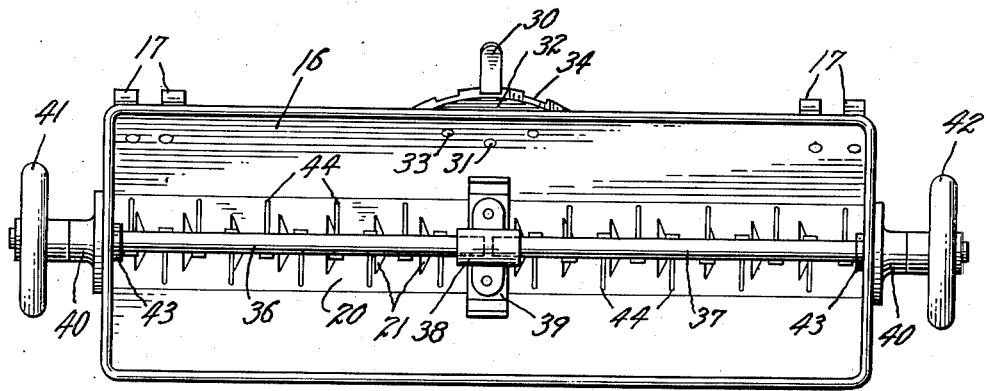
Fig. 2 is a top view of the improved distributing device removed from the mower of Fig. 1.

In Fig. 1, a conventional power lawn mower, such as a "Reo Royale," Model WD-21, as manufactured by Reo Motors, Inc., Lansing, Michigan, and as illustrated in prior Patent No. 2,573,784, is diagrammatically illustrated with its various parts designated by numeral as follows: driven wheels 10, wheel tires 11, trailing roller 12, frame 13, motor platform 14, drive motor 15 and handle 45. The invention is designed to be mounted upon the platform 14 of such a mower.

The improved distributor employs an elongated open-topped compound hopper 16, having inwardly inclined sides 16' to form a substantially V-shaped cross-section. Hinge portions 17 are secured to the back of the hopper. These hinge portions each comprise one-half of a loose-pin hinge. The remaining halves of the hinges indicated at 18, are permanently attached to the platform 14 adjacent the forward edge thereof. The two halves 17 and 18 of each hinge may be hingedly secured together, by means of withdrawable hinge pins 19, to hingedly mount the hopper 16 forwardly of the mower platform 14.

The bottom of the hopper 16 is closed by means of a perforated bottom plate 20 provided with a longitudinal series of spaced-apart discharge openings 21. The openings have an isosceles triangular shape with the bases of the triangles all directed in the same direction.

An elongated sliding valve plate 22 is supported below and against the bottom plate 20 by means of side guide clips 23 secured to the front and back of the hopper 16. The valve plate 22 is also provided with a longitudinal series of triangular ports 24 corresponding in size, shape, spacing and positioning to the discharge openings 21 in the bottom plate 20.

It can be seen that if the valve plate 22 be moved to the left in Fig. 5, the bases of the triangular valve ports 24 will first uncover just the apexes or points of the discharge openings 21 and as the movement to the left continues successively greater areas of the discharge openings will be uncovered until the openings are fully open.

The movement of the valve plate is accomplished by means of a valve lever 25 which is pivotally mounted intermediate its extremities upon a pivot rivet 26 affixed in or to the back of the hopper 16. The lower extremity of the valve lever 25 is bent to extend beneath one side of the valve plate, as shown at 52 in Fig. 4, and engages a fixed stud 27 which projects downwardly from the valve plate. A tension spring 28 extends between the lower portion of the lever 25 and the hopper 16 and acts to constantly urge the valve plate to the closed position of Fig. 5. The valve plate can be actuated toward an open position by means of a flexible chain, cord or cable 29 secured to the upper extremity of the valve lever.

The arc of swing of the valve lever 25 and consequently the amount of maximum opening of the discharge openings 21 can be preset by means of a limit lever 30 which is pivotally mounted intermediate its extremities upon a pivot member 31 projecting from a sector plate 32. The sector plate 32 is secured to the back of the hopper 16 in any desired manner, such as by means of rivets 33, and projects above the top of the back of the hopper. The upper edge of the upwardly projecting portion of the sector plate is curved concentrically about the axis of the pivot member 31 and is flanged or otherwise deformed to provide a plurality of lever notches 34 into any one of which the upper portion of the limit lever 30 may be positioned by simply flexing the lever rearwardly. Thus, the notches 34 serve to maintain the limit lever at any desired vertical angle.

The lower extremity of the limit lever 30 is provided with a protuberance or stop 35, which may be formed in any desired manner such as by bending the extremity of the lever sharply rearward to form a terminal hook or flange thereon. The stop 35 is positioned in the plane of movement of the valve lever 25.

Thus, it can be seen that if the limit lever is positioned in the furthest right notch 34, see Fig. 3, the lower extremity of the limit lever and the stop 35 thereon will be positioned far to the left to allow very little movement of the valve lever 25. If the limit lever is positioned in the furthest left one of the notches, the stop 35 will be positioned far to the right to allow the valve lever to complete a full movement so as to fully open the discharge ports in the bottom plate.

The compound material in the hopper is agitated to prevent packing and arching by means of two aligned agitator shafts 36 and 37 positioned above, and medially of, the bottom plate 20. Both shafts are journalled at their inner extremities in a common bearing 38 mounted on a central cross bracket 39 at the middle of the hopper. The shafts 36 and 37 extend outwardly from the opposite extremities of the hopper through suitable bearings 40. A resiliently-tired driven wheel 41 is mounted on the outwardly extending extremity of the shaft 36 and a similar driven wheel 42 is similarly secured upon the outwardly extending extremity of the shaft 37. The wheels 41 and 42 prevent their respective shafts 36 and 37 from moving inwardly. Set collars 43 are positioned on the shafts to prevent them from moving outwardly. Each shaft is provided with a plurality of radially extending agitating arms 44 which rotate in close proximity to the bottom plate 20.

To install the device on the lawn mower, the rear hinge portions 18 are bolted or otherwise permanently secured upon the platform 14 adjacent the forward edge thereof. The front hinge portions 17 are then matched to the rear hinge portions 18 and the hinge pins 19 are inserted to lock the hopper to the mower. This positions the center of gravity of the distributor forwardly of the hinge pins 19 so that the axis of the agitator shafts 36 and 37 will tend to swing toward the axis of the mower wheels 10 so as to bring the driven wheels 41 and 42 into frictional engagement with the tires 11 of the mower wheels 10.

It can be seen that if the lawn mower is now driven forwardly, the two agitator shafts 36 and 37 will rotate rearwardly to agitate any compound contained within the hopper.

The cable 29 is extended to a convenient position at the operator's extremity of the handle 45, and extends around a first pulley 46 mounted in a pulley bracket 47 on the rear of the hopper 16 and around a second pulley 48 mounted on or tied to the mower substantially in alignment with the axis of the hinge pins 19. By drawing upon the cable 29, the operator can swing the valve lever 25 so as to slide the valve plate 22 to the preset open position determined by the position of the stop 35 so as to distribute the soil treatment compound or other material ahead of the mower.

Should it be desired to stop distribution of the compound at any time, it is only necessary for the operator to release the cable 29, allowing the spring 28 to pull the valve plate 22 to the closed position.

Any suitable retaining hook 49 may be attached at a convenient place on the motor 15, and a flexible member 50, such as a chain or cable, may be extended from this hook to the forward edge of the hopper 16. The flexible member is provided with a ring or loop 51 which can be drawn upwardly and engaged on the hook 49 to support the forward edge of the hopper and to withdraw the driven wheels 41 and 42 from contact with the mower tires 11 when it is not desired to use the distributor.

It will be noted that if the mower is turned from its path, one of the mower wheels 10 will move at a slower speed than the other wheel. This differential movement is not interfered with by the distributor, since either of the agitator shafts may rotate at a different speed than the other agitator shaft.

While a specific form of the improvement has been described and illustrated herein, it is to be understood that the same may be varied, within the scope of the appended claim, without departing from the spirit of the invention.

Having thus described the invention, what is claimed and desired secured by Letters Patent is:

A device for use in combination with a wheeled lawn mower for distributing soil conditioning materials upon a lawn simultaneously with the mowing thereof, comprising a platform on said lawn mower, hinge supporting elements on said platform, an elongated V-shaped hopper having a plurality of discharge ports in its bottom distributed at equally spaced intervals along the entire length of the bottom thereof, hinge means on said hopper for hingedly attaching said hopper to said hinge supporting elements forwardly of said platform, a shaft extending longitudinally of said hopper and extending beyond the ends thereof, a plurality of radially extending agitating fingers at spaced intervals along said shaft, a driven wheel mounted on each extending end of said shaft, each of said driven wheels being positioned to contact the periphery of the lawn mower wheels when the lawn mower is in use so that said shaft is rotated in consequence of movement of the lawn mower, a valve plate mounted in the bottom of said hopper and extending stubstantially the entire width thereof, said valve plate being longitudinally slidable selectively to open and close said ports, said ports being triangular in shape whereby the flow through said ports may be variably governed by the degree to which they are opened by said plate, a substantially vertical valve lever pivotally mounted on the rear of said hopper and extending downwardly and forwardly beneath said hopper, flexible means connected with the upper end of said lever whereby said lever may be swung from a remote point, means connecting the lower end of said lever to said plate whereby swinging of said lever moves said plate to open said ports, spring means connecter between the lower end of said lever and said hopper to return said lever and hence said plate to port closing position upon release of tension on the flexible lever swinging means, a limit lever pivoted on the rear of said hopper, means of latching said limit lever in any clearance position in the path of said first mentioned lever to limit the swing of the latter to any desired arc and hence control the degree of opening of said ports, means connected with said hopper for swinging the latter in an arc to swing said driven wheels out of contact with said lawn mower wheels to discontinue operation of said agitation, and means for securing said hopper in raised position.

References Cited in the file of this patent

UNITED STATES PATENTS

| | | |
|---|---|---|
| 1,876,409 | Gordon | Sept. 6, 1932 |
| 2,245,152 | Masters | June 10, 1941 |
| 2,541,008 | Stahmer et al. | Feb. 6, 1951 |
| 2,573,784 | Asbury | Nov. 6, 1951 |
| 2,670,880 | Ajero | Mar. 2, 1954 |
| 2,728,492 | Fox | Dec. 27, 1955 |